Dec. 10, 1929. J. H. McCOLLOUGH 1,738,784
TRACTOR
Filed Aug. 16, 1927 3 Sheets-Sheet 1

INVENTOR
James H. McCollough
John A. Naismith
ATTORNEY

Dec. 10, 1929.  J. H. McCOLLOUGH  1,738,784
TRACTOR
Filed Aug. 16, 1927  3 Sheets-Sheet 2
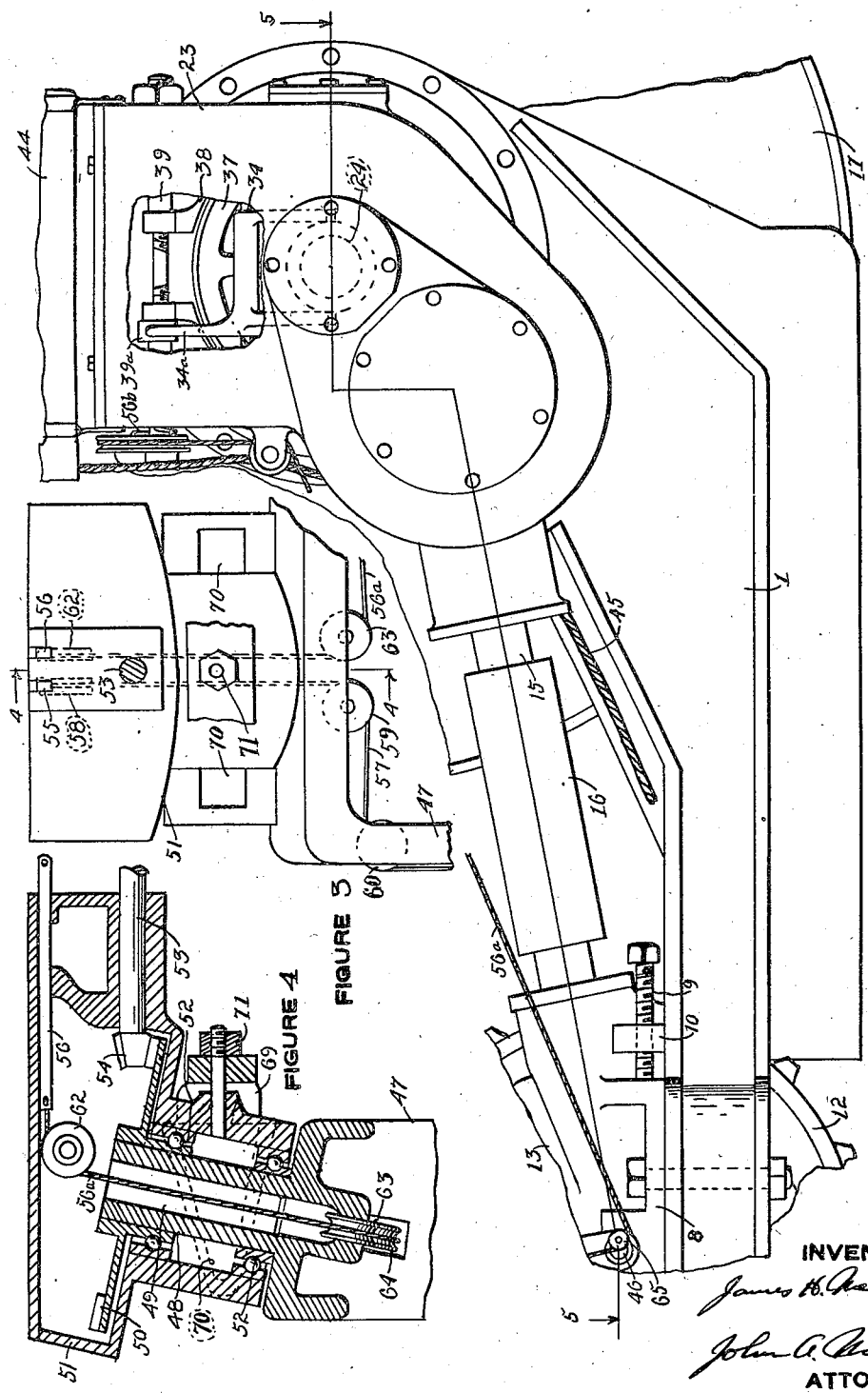
INVENTOR
James H. McCollough
John A. Nasmith
ATTORNEY

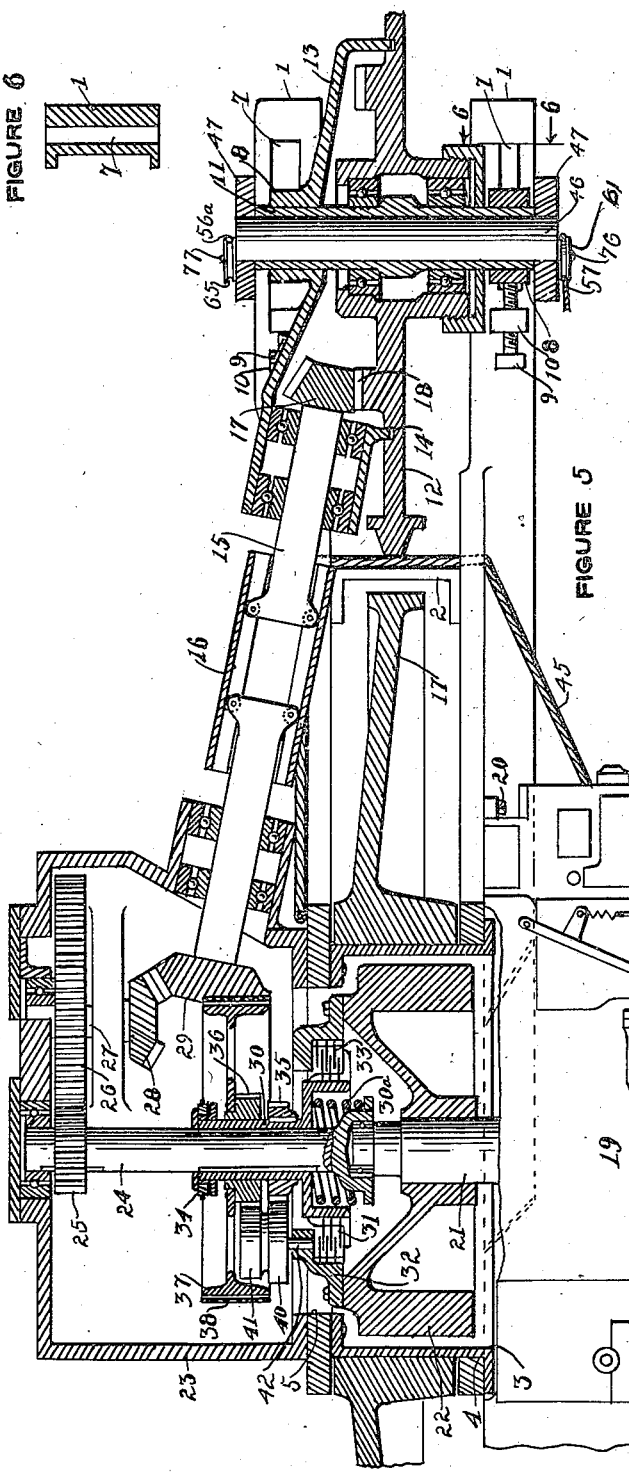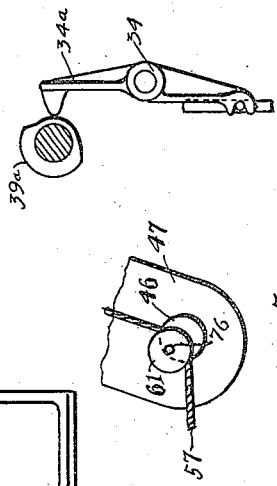

Patented Dec. 10, 1929

1,738,784

UNITED STATES PATENT OFFICE

JAMES H. McCOLLOUGH, OF SAN JOSE, CALIFORNIA

TRACTOR

Application filed August 16, 1927. Serial No. 213,341.

This invention relates particularly to the track laying type of tractor wherein the desired traction is secured through the medium of a single track, and more particularly to a tractor consisting of a forward pulling unit and a rear balancing unit, the forward pulling unit being steered and controlled by the operator on the rear balancing unit.

In the application of mechanical power to farm work certain limitations have become apparent. In farm work it is desirable to have the tractor and the implement operated by one man. In the cultivation of many crops it is essential that the operator be positioned on the implement. It is also essential that the tractor be narrow enough and compact enough to be operated in the space between the rows of growing crops, and yet be powerful enough and efficient enough to pull the heavy implements designed for use with two or more animals. It is also essential to economical use on the farm that the tractor be readily attached to and detached from the various farm implements. Many attempts have been made in the past to provide machines which will do this work satisfactorily but without success. It is the object of this invention to provide a machine which will work efficiently on any kind of soil condition; which will subject the land to only a few pounds pressure per square inch as it passes over it; which will have no limitation upon its being able to turn with its load in short spaces; which can be easily and accurately driven; and which will hook to any kind of useful farm implement in such fashion that the combination of tractor and tool is a workable one-man outfit.

It is another object of the invention to provide a tractor of the character indicated comprising separable pulling and balancing units wherein the pulling unit comprises a single track and driving means therefor with suitable controls, and a rear balancing unit carrying the driver's seat and detachably connected to the pulling unit in such a manner as to position the said controls in proper relation to the driver's seat, the balancing unit being a vehicle or any one of the several different types of earth working implements.

It is still another object of the invention to provide a tractor of the character indicated that will provide the required traction and power for pulling a vehicle or earth working implement and yet be sufficiently small, compact and flexible to be readily operated between the rows of plants in the field and turned in a small space at the ends of said rows.

It is also an object of the invention to provide a tractor of the character indicated so balanced as to be easily supported against lateral inclination to its normal vertical plane, and so balanced as to prevent the raising of the front end of the pulling unit from the ground when pulling a heavy load.

It is also an object of the invention to provide a tractor of the type indicated provided with a steering mechanism so constructed as to cause the pulling unit to incline inwardly when turning in the arc of a circle, thereby rendering the same more stable.

In the drawing:

Figure 2 is an enlarged side elevation of a portion of the tractor.

Figure 3 is a rear elevation of a portion of the steering head and fork.

Figure 4 is a sectional view on 4—4 of Figure 3.

Figure 5 is a sectional view on line 5—5 of Figure 2, partly in elevation and part broken away.

Figure 6 is a detail section on 6—6 of Figure 5.

Figure 7 is a detail elevation of the lower end of one of the steering forks and the sheave thereon.

Figure 8 is a detail of a portion of the clutch operating mechanism.

Figure 1:
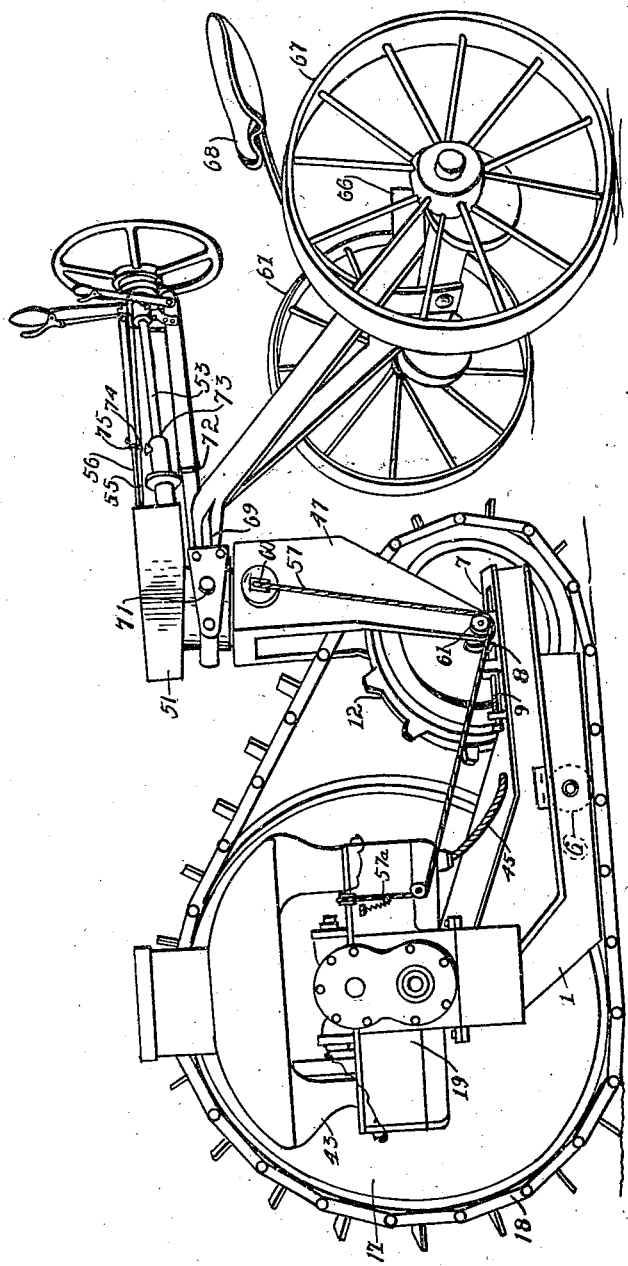
Figure 1 is a perspective illustration of a tractor embodying my invention, minor details being omitted.

Referring more particularly to the drawing, I show at 1—1 the two side members of a frame rigidly supported and connected by cross bar 2 and a trunnion 3, the said trunnion being positioned between the upstanding forward portions of the members. One member has an annular opening 4 formed therein in axial alignment with the cylinder or trunnion 3 and the other member has an annular opening 5 of less diameter than opening 4 formed therein in axial alignment with opening 4. A roller is shown at 6 mounted on the frame intermediate its ends as shown. In the rear end of each member 1 is formed a vertical slot as 7, and slidably mounted in each slot is a shoe 8 adjusted by means of a screw 9 engaging its forward side and operatively mounted in a boss 10 mounted on the member 1.

Revolubly mounted in the shoes 8 is a sprocket shaft 11, this shaft being hollow as shown, and revolubly mounted on the shaft 11 is a sprocket 12. Fixedly mounted upon one of the shoes 8 and concentrically arranged relative to the shaft 11 is a cap 13 having its edge engaging a groove 14 in the adjacent side of sprocket 12 whereby to form a closed chamber for certain working parts hereinafter described. In the forward portion of this cap is revolubly mounted one end of a shaft 15 fitted with a universal joint 16. The shaft 15 carries a pinion 17 meshing with a gear 18 on the side of sprocket 12. The result of this construction is that the sprocket may be accurately adjusted by means of the adjustable shoes 8, and the sprocket may be rotated on the shaft by means of the driving shaft 15.

Journaled upon the trunnion 3 between the side members 1—1 of the frame is an idler wheel 17, and mounted upon the idler 17 and sprocket 12 is a track 18. The tension of the track is adjusted by adjustment of the sprocket 12, the same being driven by said sprocket, the idler being driven through frictional engagement between it and the said track so that when power is applied to rotate the driving shaft 15 the track is laid and the tractor moved over it.

The power is derived from a suitable power plant such as an internal combustion engine 19 mounted upon one side of the frame 1 so that its crank shaft is axially aligned with the trunnion 3, and secured by bolts as 20. The shaft 21 carries a fly-wheel 22 positioned within the trunnion 3.

The transmission of power from the crank-shaft 21 to the shaft 15 is effected in the following manner. A housing 23 is mounted upon the side of frame 1 opposite to the engine 19, and a drive shaft 24 is revolubly mounted in the housing and upon one end of the crank-shaft 21 and in alignment with the shaft 21. This shaft carries a pinion 25 meshing with a gear 26 which is in turn mounted upon a stub-shaft 27 revolubly mounted in the housing 23 and carrying a bevel gear 28. Meshing with the bevel gear 28 is a gear 29 mounted on the shaft 15 hereinbefore described. The result of this construction is that when the normally inoperative drive shaft 24 is caused to rotate the power is transmitted directly to sprocket 12.

The driving connection between the shafts 21 and 24 is effected in the following manner. Keyed to the shaft 24 is a slidable sleeve 30 having friction discs 31 mounted thereon. Mounted on the opposing end of the fly-wheel 22 is an annular flange 32 having a number of friction discs mounted thereon in staggered relation to and overlapping the discs 31. At 34 is shown an operating mechanism by means of which the sleeve 30 may be advanced to break the driving connection between the discs, a spring being shown at 30ª for moving the sleeve in the opposite direction and bringing the discs into driving engagement when permitted by the mechanism indicated at 34.

For reversing the direction of rotation of the shaft 24 the following mechanism is provided. On the sleeve 30 is keyed a gear 35, and adjacent the gear 35 is revolubly mounted a second gear 36. On the gear 36 is mounted a brake drum 37 controlled by a band 38 and a suitable operating mechanism 39. The numerals 40—41 indicate integrally formed pinions meshing with the gears 35 and 36 respectively and mounted on a stub-shaft 42 on the flange 32. When the clutch 31—33 is disengaged the larger pinion 40 travels around the gear 35 while the smaller pinion 41 causes the drum 37 to rotate. Upon applying the brake band 38 the pinion 41 is caused to rotate relative to gear 36 thereby causing pinion 40 to rotate the gear 35 and shaft 24 backwardly.

Since these driving connections are controlled by a single cable some operating connection must be made between the two. This is secured by mounting a cam 39ª on the brake control, and an arm 34ª on the mechanism 34 operating sleeve 30. The cam is so positioned that when the braking mechanism is operated as by pulling a cable 56ª, the arm 34ª is first operated to move sleeve 30 and break contact between the driving discs. Further movement of the braking mechanism draws the band down upon the brake drum with the result above set forth. When the cable 56ª is released a spring 56ᵇ returns the mechanism 39 to a normal position.

The water cooling system for the engine is indicated generally by the numeral 43, the fuel tank being indicated in part at 44 and connected to the engine by conduit 45.

Incorporated as a part of the pulling unit is the steering mechanism now to be described. This comprises a rock-shaft 46 mounted in the sprocket shaft 11 and a fork 47 straddling the sprocket and mounted on the ends of the rock-shaft. Extending upwardly from the upper end of the fork is a pivot-pin 48, this pin being rearwardly inclined as shown, in the present case about ten degrees from the vertical. This pin has a passage formed longitudinally therethrough as at 49 and has a gear mounted on its upper end as at 50. A housing 51 is shown enclosing the gear and revolubly mounted on the pin at 52. In the housing is mounted a steering shaft 53 carrying a pinion 54 meshing with the gear 50. Slidably mounted in the housing and extending rearwardly therefrom are rods 55 and 56. The rod 55 operates a cable 57 passing over a pulley 58, through passage 49, and over pulleys 59, 60 and 61 to the engine carburetor, and the rod 56 operates a cable 56ª passing over pulley 62 through passage 49 and over pulleys 63, 64 and 65 to the mechanism 39—34. The cable 57 operates against the tension of a spring 57ª.

It may now be readily understood that after the engine has been started the tractor may be driven forwardly by releasing the cable 56ª or driven backwardly by operating the cable in the opposite direction, and the operation of the engine itself may be controlled by means of the cable 57.

It will be noted that this pulling unit is complete in so far as the power, driving and controlling mechanism is concerned, but it is not inherently stable and in practical use must be provided with a balancing unit. For this I contemplate using any form or type of vehicle or earth working implement having spaced supporting elements, and provided with a suitable connecting means and, preferably, a seat for the operator. For the purpose of illustration I have shown a vehicle 66 with spaced wheels 67 and fitted with a seat 68 and tapered drawbars 69 fitting into tapered sockets 70 in housing 51 where they are held securely in place by any suitable fastening means as 71. By providing the various implements with identical connections to the housing 51 they become readily interchangeable. Since implements of various types vary greatly in size their seats will be variably spaced from the pulling unit when they are attached thereto. In order to place the steering wheel and control in proper relation to the seat in each case, the steering wheel support, the steering rod, and the carbureter control rod and clutch control rod, are each telescoped as indicated at 72, 73, 74 and 75.

As above described the idler wheel is positioned forwardly of the drive wheel and is considerably larger than the drive wheel. The power plant with the greater portion of the transmission mechanism, the water and the gasoline tanks are mounted on the frame about the axis of the idler wheel thereby making an exceptionally compact construction possible and placing the great bulk of the weight at the front end of the tractor where it is useful in holding the track flat upon the ground when pulling a heavy load.

When the tractor is in use there will, of course, be a limited relative rocking movement between the track carrying portion of the pulling unit and the fork 47 and parts carried thereby. To prevent this rocking movement from operating the cables 56ª and 57 I mount the pulleys 61 and 65 eccentrically to the axis of the rock shaft 46 as shown at 76 and 77 respectively.

It is to be understood, of course, that while I have herein shown and described but one specific embodiment of the invention, changes in form, construction and method of assembly and operation may be made within the scope of the appended claims.

I claim:—

1. A tractor including an inherently unstable pulling unit comprising a driving wheel, an idler wheel of greater diameter than the driving wheel, a connecting frame supporing the wheels in a common plane, a track mounted on the wheels, a power plant mounted on the frame about the axis of the idler wheel, transmission means inserted between the power plant and the driving wheel, steering means for the unit, and means for connecting a stabilizing means to the unit.

2. In a tractor, a pulling unit comprising a frame, a rear drive wheel mounted thereon, an idler wheel mounted thereon forwardly of the drive wheel and in the plane of the drive wheel, an endless track mounted on said wheels, a power plant mounted on the frame about the axis of the idler wheel, and power transmission mechanism connecting the power plant and drive wheel.

3. In a tractor, a pulling unit comprising a frame, a rear drive wheel mounted thereon, an idler wheel mounted thereon forwardly of the drive wheel and in the plane thereof, an endless track mounted on said wheels, a power plant mounted on the frame about the axis of the idler wheel and on one side thereof, and power transmission mechanism extending through the idler wheel and thence to the drive wheel.

4. In a tractor, a pulling unit comprising a frame, a rear drive wheel mounted thereon, an idler wheel mounted thereon forwardly of the drive wheel and in the plane thereof, an endless track mounted on said wheels, a power plant mounted on the frame about the axis of the idler wheel, and on one side thereof, and provided with a flywheel positioned within the idler wheel in axial relation thereto and in the plane thereof, and power transmission mechanism mounted upon the other side of the idler wheel and operatively connected to the flywheel and the rear drive wheel.

5. A tractor including a pulling unit comprising a frame, a rear drive wheel mounted thereon, an idler wheel mounted thereon forwardly of the drive wheel and in the plane thereof, an endless track mounted on said wheels, a power plant mounted on the frame about the axis of the idler wheel, and power transmission mechanism connecting the power plant and drive wheel, an upstanding and rearwardly inclined steering column mounted on the frame adjacent the drive wheel, a head pivotally mounted on the column, steering means mounted in the head and connected to the column and extending rearwardly therefrom, and a balancing unit connected to said head.

6. A tractor including an inherently unstable pulling unit comprising a frame, a rear drive wheel mounted thereon, an idler wheel mounted thereon forwardly of the drive wheel and in the plane thereof, an endless track mounted on said wheels, a power plant mounted on the frame about the axis of the idler wheel, power transmission mechanism connecting the power plant and drive wheel, and steering mechanism mounted on the frame adjacent the drive wheel, and a balancing unit connected to the steering mechanism.

7. The combination with a power operated track laying pulling unit of the character described, including a driving wheel for the track, of a rock-shaft axially mounted in the drive wheel, a forked steering column mounted on the rock-shaft and having an upstanding rearwardly inclined hollow shaft on its upper end, a steering head revolubly mounted on the head, controls for the working mechanism of the pulling unit mounted on the head, pulleys mounted in said head and on said column, and independently movable cables connected to said controls and engaging said pulleys, and passing from the controls downwardly through said hollow shaft, thence outwardly to the sides of the steering column, thence downwardly and through the axis of the rock-shaft, and thence forwardly to the working mechanism of the pulling unit.

8. The combination with a power operated track laying pulling unit of the character described, including a drive wheel for the track, of a rock-shaft axially mounted in the drive wheel, a steering column mounted on the rock-shaft, a steering head revolubly mounted on the column, and control means for the operating mechanism of the pulling unit mounted on the steering column and head.

JAMES H. McCOLLOUGH